United States Patent [19]

Aida et al.

[11] 4,320,564
[45] Mar. 23, 1982

[54] COIL WINDING MACHINE

[75] Inventors: Masaaki Aida, Yokohama; Takashi Kobayashi, Fujisawa; Hiroshi Saitoh, Yokohama, all of Japan

[73] Assignee: Hitachi, Ltd., Tokyo, Japan

[21] Appl. No.: 94,924

[22] Filed: Nov. 16, 1979

[30] Foreign Application Priority Data

Nov. 20, 1978 [JP] Japan ................... 53-142394

[51] Int. Cl.³ ............... H01F 41/06; H02K 15/08
[52] U.S. Cl. ............................ 29/33 L; 29/732; 29/820; 242/7.05 B
[58] Field of Search ............ 29/33 L, 820, 732; 242/7.05 B, 7.05 A

[56] References Cited

U.S. PATENT DOCUMENTS

| | | | |
|---|---|---|---|
| 1,544,623 | 7/1925 | Apple | 29/33 L |
| 2,284,373 | 5/1942 | Cullin | 29/33 L |
| 3,098,616 | 7/1963 | Eminger | 242/7.05 B |
| 3,361,371 | 1/1968 | Dickensheets et al. | 242/7.05 B |
| 3,395,449 | 8/1968 | Moore | 242/7.05 B |

*Primary Examiner*—William R. Briggs
*Attorney, Agent, or Firm*—Craig and Antonelli

[57] ABSTRACT

A coil winding machine for winding a coil on a cylindrical core having peripheral slots such as the rotor core of an electric motor, particularly suitable for use in the coil winding on a core having small intersecting angle of a pair of the peripheral slots for receiving wires of the same coil. To the lower end of a rotary shaft having the flyer, attached are a former rotatable relatively to the rotary shaft and provided with a guide portion opposing to the end surface of the core, and a pair of winding frames positioned between the end surface of the core and the guide portion of the former. A pair of bending means are disposed to oppose to each other with the winding frames interposed therebetween. The bending means are movable toward and away from said winding frames and also in the up and down directions.

6 Claims, 9 Drawing Figures

COIL WINDING MACHINE

BACKGROUND OF THE INVENTION

The present invention relates to a coil winding machine for winding the coil of the core of a dynamoelectric machine such as a generator or a motor and, more particularly, to a coil winding machine suitable for use in winding coils around a core in which the angle formed between the neutral axes of a pair of slots for receiving the same coil around the axis of the core is around 90° or smaller. This angle will be referred to as "intersecting angle", hereinafter.

In dynamoelectric machines, a cylindrical member such as, for example, a rotor core is provided in its peripheral surface with a required number of slots which extend in parallel with the axis of the rotor core, the slots being adapted to receive the wires for forming the coils. In some cases, it is required that the intersecting angle formed between a pair of slots for receiving the wires of the same coil is 90° or smaller.

If the core has a sufficiently large intersecting angle between the pair of slots, it is allowed to make the coil winding such that the wires extend along the shortest path on each axial end surface of the core, thereby to minimize the length of each coil. However, in case where the intersecting angle is as small as 90° or less, the end coil on each axial end surface will inconveniently overlie the axial end opening of the slot or slots between the pair of slots in which the coil is formed, if the end coil on each axial end surface of the core is formed along the shortest path. In such a case, it is not possible to correctly place the required number of wires in those slots between the pair of slots receiving the coil. In addition, the small intersecting angle of 90° or less causes a tendency that the wires in each of the pair of slots are inconveniently accumulated on the side wall of the slot closer to the other slot of the pair, so that the wires are placed in each slot only at a small rate of occupation of the slot volume.

The following method has been proposed as a measure for mechanically winding coils at a small intersecting angle while obviating the above-described problems.

According to this method, an arcuate end guide for locating the end coil is disposed at each axial end of the core, and the wire continuously extracted from the flyer of the coil winding machine is wound round the end guide. The wire is slided along the end guide due to its tension, so that the end coil is formed near the center of the end surface of the core.

This method eliminates the aforementioned problem of the closure of end opening of intermediate slot by the end coil. In addition, since the end coil is pulled radially inwardly, the wires in each slot are pulled and accumulated on the bottom of the slot to improve the rate of occupation of the slot volume.

This method, however, poses the following problems. Namely, since the wires of the end coil are accumulated on the end guide and concentrated to the narrow region near the axis of the core, the amount of projection of the end coil from the end surface and, hence, the length of the coil are inconveniently increased. In order to reduce the projection amount of the end coil from the end surface of the core, it is necessary to conduct a shaping work to suitably shape the end coils after the winding of all coils. This shaping is extremely difficult to conduct and can be made only at an extremely low efficiency of work, because the end coils are concentrated to the restricted area.

SUMMARY OF THE INVENTION

It is, therefore, an object of the invention to provide a coil winding machine for winding coils of a dynamoelectric machine, capable of automatically winding coil and shaping the end coils, in the coil winding on a core of a small intersecting angle of the slots.

It is another object of the invention to provide a coil winding machine for winding coils of a dyanamoelectric machine, capable of automatically winding coil and shaping the end coils and improving the rate of occupation of the slot volume, in the coil winding on a core of a small intersecting angle of the slots.

To these ends, according to the invention, a winding frame is disposed at each axial end of the core. The winding frame has a winding surface which is spaced by a predetermined distance from the end surface of the core, so that the end coil of the coil laid in the slots may be wound and formed preserving the minimum length necessary for the shaping of the coil and end coil. Also, a former is disposed at a predetermined distance from the winding frame. This former is adapted to guide the wires toward the bottom of the slot so that the wires may be laid regularly in sequence from the bottom toward the peripheral opening of each slot. Further, an end coil bending member adapted to press and bend the end coil toward the axis of the core is disposed to oppose to the winding frame.

In use, after winding the wires in the slots and around the winding frame to form a predetermined coil, the winding frame is extracted from the space between the end surface of the core and the formed end coil, and the end coils are bent toward the axis of the core by means of the bending member. In consequence, the end coils are bent toward the axis of the core and pressed onto the end surface of the core, thus completing the shaping automatically.

DESCRIPTION OF THE PREFERRED EMBODIMENTS

Preferred embodiments of the invention will be described hereinunder with reference to the accompanying drawings.

Referring first to FIGS. 1 to 6 which in combination show a first embodiment of the invention, a required amount of slots 2 are formed in the peripheral surface of a core 1 of a dynamoelectric machine, at a predetermined circumferential pitch. A frame 4 standing up from a base 3 carries an arm 5 for free up and down movement. The arm 5 is adapted to be moved up and down to and from the desired position by driving means which is not shown. A hollow rotary shaft 6 is carried rotatably by means of a pair of bearings 7 on one end of the arm 5, in such a manner that the axis of the shaft 6 extends in the vertical direction. A sleeve 10 attached to the upper end of the rotary shaft 6 has an eccentric guide bore 9 for guiding a wire 8 into the rotary shaft 6. A pulley 11 is attached to the lower portion of the sleeve 10. A motor 12 is fixedly mounted on the arm 5. The motor has a shaft which also carries a pulley 13. The arrangement is such that the torque of the motor 12 is transmitted to the shaft 6 to drive the latter through a belt 14 stretched between the pulleys 11 and 13. The pulleys 11, 13 and the belt 14 may be timing pulleys and timing belt, respectively.

Figure 1:
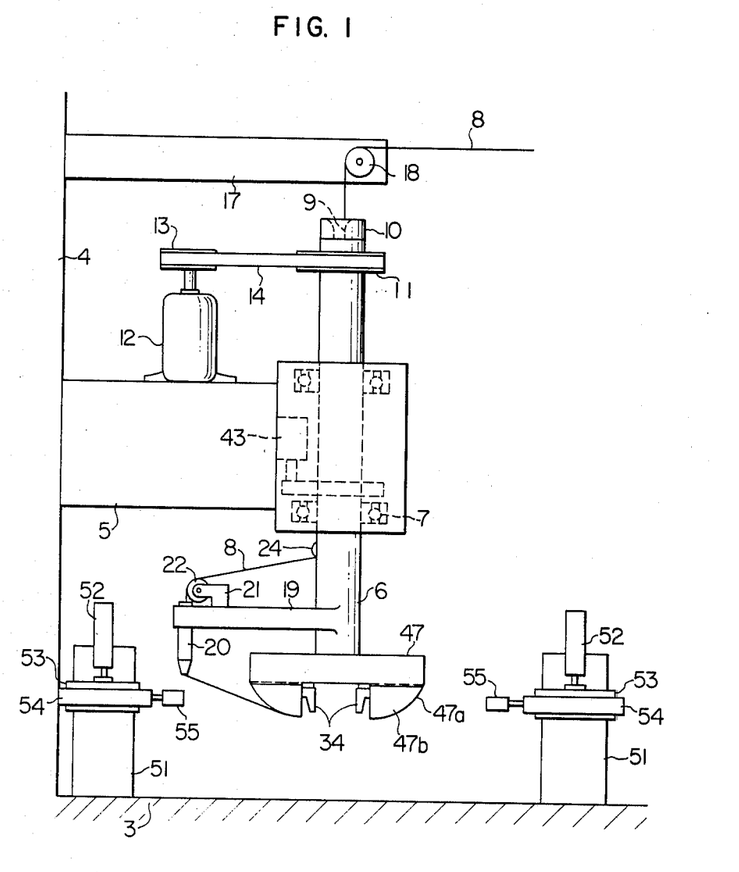
FIG. 1 is a side elevational view schematically showing the construction of a coil winding machine constructed in accordance with the invention.

A support member 17 is fixed to the frame 4 so as to take a position above the arm 6. A roller 18 for guiding the wire 8 is rotatably attached to the end of the support member and takes a position above the rotary shaft 6. The wire 8 extracted from a wire supply reel (not shown) is introduced into the rotary shaft 6 by means of the roller 18 and through the guide bore 9.

Figure 2:
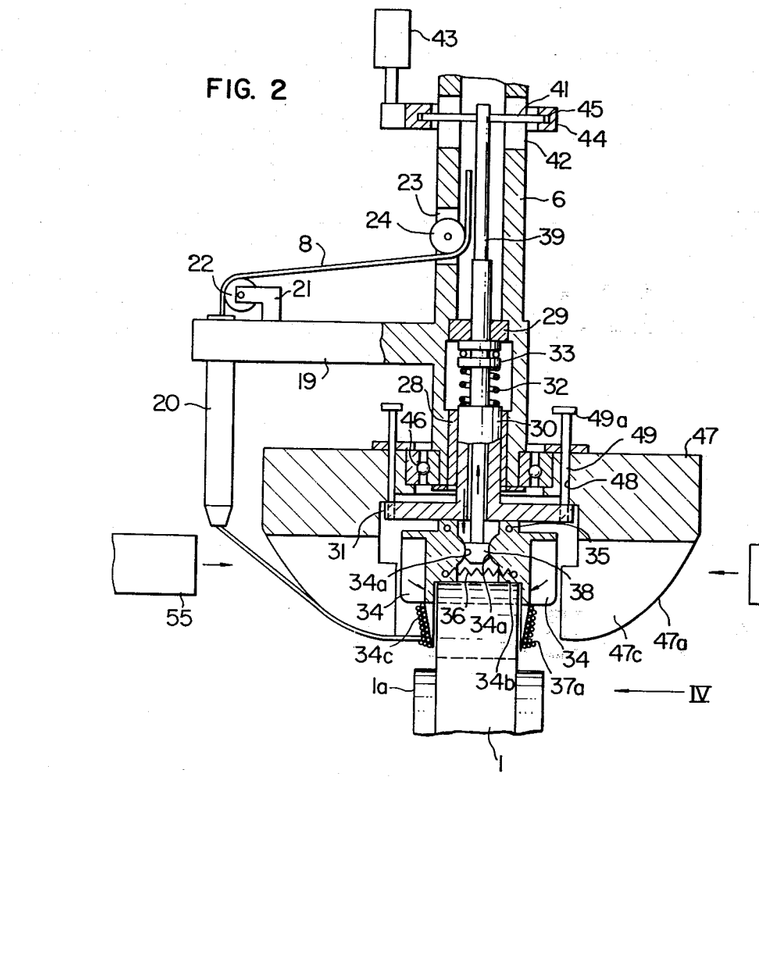
FIG. 2 is an enlarged sectional view of a portion of the coil winding machine shown in FIG. 1.

An arm 19 unitarily formed with the lower end of the rotary shaft 6 carries at its one end a nozzle 20 fixed thereto. Also, a roller 22 is carried by the same end of the arm 19 through the medium of a support member 21, so as to take a position above the nozzle 20. The arm 19 and the nozzle 20 in combination constitutes a flyer. The rotary shaft 6 is provided at its portion above the arm 19 with a hole 23 which rotatably receives the roller 24. Therefore, the wire 8 introduced into the rotary shaft 6 is taken out of the latter through the hole 23, and is brought to the nozzle 20 via the rollers 24 and 22. The wire 8 is then extracted from the lower end of the nozzle 20. Slide bearings 28, 29 are fixed to suitable portions of the inner peripheral surface of the rotary shaft 6 at the lower end portion of the latter. A stationary disc 31 projecting outwardly from the rotary shaft 6 has a stepped hollow journal 30 adapted to rotatably and slidably fit the slide bearings 28, 29. A spring 32 and a thrust bearing 33 are attached to the reduced diameter portion of the journal 30. The journal 30 is received by the rotary shaft 6 such that the thrust bearing 33 abuts the slide bearing 29. A pair of winding frames 34 are rotatably secured to the lower surface of the stationary disc 31 by means of pins 35 so as to oppose to each other. These winding frames are so biased that they approach each other at their free ends, by means of a spring 36.

The winding frames 34 are provided at their opposing surfaces with arcuate projections 34a and stepped portions below the projections 34a and adapted to contact the outer peripheral surface of the core 1.

Also, the outer end surface of each winding frame 34 is formed as a tapered surface 34c for facilitating the withdrawal of the winding frame 34 from the wound coil 37. Further, each side surface of the winding frame 34 is formed as a tapered surface 34d approximating the edge line formed by the end surface of the core 1 and the wall of the slot 2. A groove 34e is formed at the lower end portion of the winding frame 34.

Figure 3:
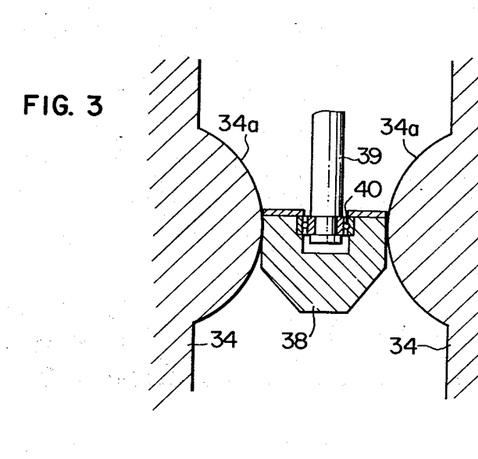
FIG. 3 is an enlarged sectional view of a cam shown in FIG. 2.
Figure 4:
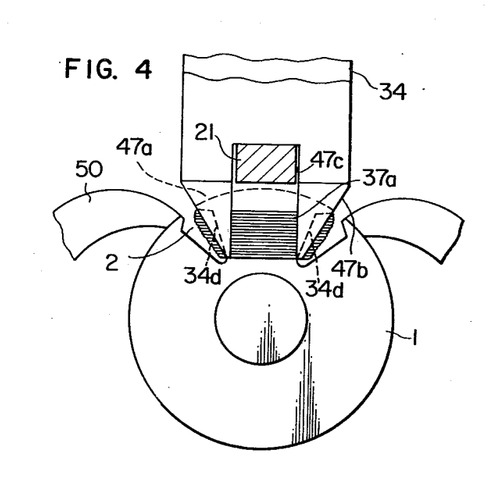
FIG. 4 is a view as seen in the direction of arrow IV.
Figure 5:
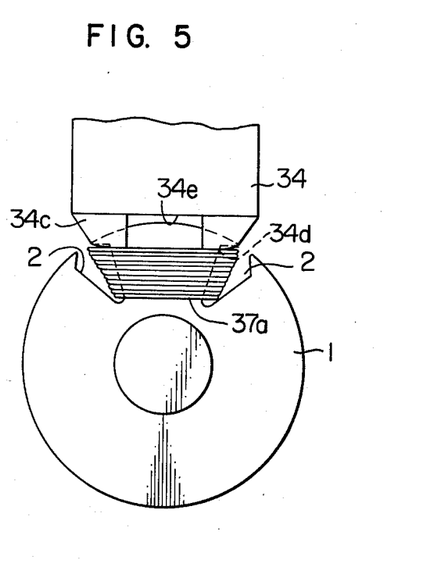
FIG. 5 is a front elevational view showing the state of the coil.
Figure 6:
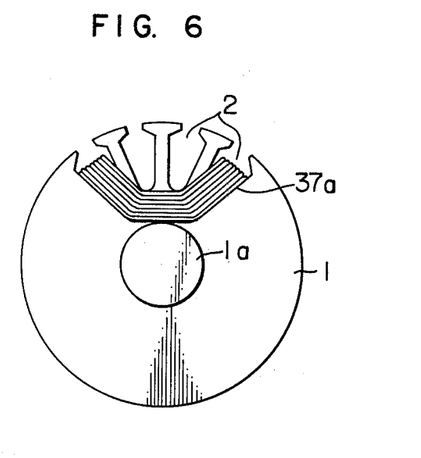
FIG. 6 is a front elevational view of an end coil after the shaping.

A cam 38 interposed between the opposing surfaces of the winding frames 34 has a columnar body provided at its end with a conical guide portion.

A rod 39 is rotatably coupled to the cam 38 through the medium of a bearing 40. The aforementioned rod extends through the stationary disc 31 and the journal 30 of the latter slidably and rotatably.

A horizontal shaft 41 is coupled to the upper end of the shaft 39 and slidably extends through an elongated bore 42 formed in the central portion of the rotary shaft 6. The shaft 41 is slidably received at its both ends by a groove 45 formed in the inner peripheral surface of an annular liftable member 44 support by the rod of a cylinder 43 which in turn is fixed to the arm 5. Therefore, the rod 39 is rotated as the rotary shaft 6 rotates, through the action of the shaft 41. However, the winding frames and the cam 38 are prevented from rotating, due to the action of the slide bearings 28, 29 and the bearing 40.

Then, as the liftable member 41 is moved by the action of the cylinder 43, the cam 38 is moved up and down through the action of the shaft 41 and the rod 39. As a result, the points of engagement between the cam 38 and the projections 34a of the winding frame 34 is changed so that the winding frames 34 are rotated around respective pins 35 through the action of the cam 38 and the spring 36.

A former 47 is rotatably carried by a bearing 46 fitting around the outer peripheral surface of the lower end of the rotary shaft 6. The former 47 has both ends projected downwardly so as to oppose to the tapered surfaces 34c of the winding frames 34 at a predetermined gap left therebetween. An arcuate guide surface 47a is formed on the end surface of the former 47.

Tapered surfaces 47b approximating the tapered surface 34d of the winding frames 34 are formed on both sides of the former 47. Further, a groove 47c is formed in the center of the lower face of the former 47. The former 47 is provided also with bores 48 which extend in parallel with the rotary shaft 6. Each of the bores 48 slidably receives a rod 49 which is fixed at its one end to the stationary disc 31 and provided at its one end with a stopper 49a. The former 47, therefore, does not rotate even when the rotary shaft 6 is rotated, unless the stationary disc 31 rotates. However, the former 47 is moved up and down together with the rotary shaft 6, as the latter is slided in the axial direction. The relative position between the winding frames 34 and the former 47 in the axial direction of the rotary shaft 6 can be adjusted by changing the compression load of the spring 32.

A guide 50 is mounted on the base 3 in such a manner as to contact the outer peripheral surface of the core 1, and is adapted to guide the wire 8, which has been extracted from the nozzle 20 by the rotation of the flyer, into the slot 2 of the core 1. Therefore, the wire 8 extracted from the nozzle 20 in the axial direction of the core 1 is slid along the guide 50 toward to a position above the opening of the slot 2 and contacts with the tapered surface 47b of the former 47. The wire 8 extracted to the periphery of the former 47 from the nozzle 20 is guided along the tapered surface 47b and the guide surface 47a of the former 47 toward to the axis of the core 1. Thereafter, the wire slides along the lower end surface of the former 47 and is moved toward the end surface of the core 1. At this moment, the wire 8 in the position above the opening of the slot 2 is moved along the tapered surface 47b of the former 47, so that the wire is guided into the slot 2. After passing the lower end surface of the former 47, the wire 8 flies to the tapered surface 34c of the winding frame 34 and is wound round the winding frame 34 at such a position where the length of the wire 8 is minimum.

A pair of stands 51 are mounted on the base 3 so as to oppose each other with the winding frames 34 interposed therebetween. Each of the stands 51 carries an upright cylinder 52 extending upward therefrom Also, each stand carries a slide member 53 for free vertical movement. The slide member 53 is coupled to one end of the rod of the aforementioned cylinder 52. It will be seen that the slide members 53 are moved up and down as respective cylinders 52 are actuated. Further, the slide members carry cylinders 54 which are directed toward each other. Each of the cylinders has a bending member 55 fixed to the rod thereof.

The coil winding apparatus heretofore described operates in a manner explained hereinafter.

After locating the core 1 at a predetermined winding position, the guide 50 is placed in such a manner as to contact the outer peripheral surface of the core 1. Then, the cylinder 43 is energized to lower the cam 38 to drive it into the gap between the opposing projections 34a of the winding frames 34, thereby to move the lower ends of the winding frames 34 away from each other, overcoming the force of the spring 36. Subsequently, the arm 5 is lowered to bring the stepped portions 34b of the winding frames 34 into contact with the outer peripheral surface of the core 1, until the lower end surface of the former 47 comes to take the same level as the bottom of the slot in which the wire of the coil is to be laid. Then the leading end of the wire 8 extracted from the nozzle 20 is fixed to the preselected points and, thereafter, the motor 12 is started to rotate the flyer through the action of the rotary shaft 6. As a result, the wire 8 is extracted from the nozzle 20 and is guided by the guide 50 and the former 47 thereby to form a coil 37 over the slots 2 of the core and the winding frames 34. In this connection, it is to be noted that the wire 8 is guided without fail toward the bottom of the slot 2, so that the coil is formed regularly as layers from the bottom to the peripheral opening of each slot 2. Nothing restricts nor restrains the wire 8 after it has passed the lower end surface of the former 47, so that the wire flies over the space between the winding frame 34 and the former 47 toward the tapered surface 34c of the winding frame 34, and is wound on the tapered surface 34c so as to connect the coils 37 in the slots 2 with the minimum distance. The motor 12 is stopped after forming the required number of turns of the coil. Subsequently, the cylinders 54 are energized to move the bending members along the groove 47c of the former 47 until they come to contact the winding frames 34. Then, the cam 38 is raised by the action of the cylinder 43. As a result, the winding frames 34 are rotated by the resetting force of the spring 36, permitting the tapered surfaces 34c to leave the end coil 37a. As the arm 5 is raised subsequently, the rotary shaft 6 commences to move upward together with the former 47. Then, the winding frame 34 starts to rise as the former 47 abuts the stoppers 49a so that the winding frames 34 are withdrawn from the coil 37. Subsequently, the cylinders 52 ar energized to lower the slide members 53, so that the bending members 55 are lowered through the action of the cylinders 54 thereby to bend the end coil 37a toward the axis of the core 1. This bending causes also a bending or deformation of the end coil 37a around the axial end openings of the slots 2 toward the end surface of the core 1, the end coil 37a is forcibly made to contact the end surface of the core 1, so that the amount of projection of the end coil 37a from the core end surface is sufficiently decreased. At the same time, due to the bending of the end coil 37a toward the axis of the core, the slot or slots between the pair of slots 2 in which the coils are formed are revealed and opened. Subsequently, after raising the bending members 55 by reversing of the cylinders 52, the cylinders 54 are energized to retract the bending members 55.

The coil for a pair of slots is thus formed. This operation is repeated after indexing the core 1 by a predetermined angle, so that the desired number of coils are formed on the core.

In the described embodiment, the winding frames 34 are movable relatively to the rotary shaft 6 and the former 47, so that the coil winding machine may be used for coil windings on cores of different diameters. This, however, is not exclusive and the stationary disc 31 can be fixed to the former 47 unitarily with the latter, if the coil winding machine is intended for use in connection with only one kind of core having a predetermined core diameter and lamination thickness. It will be apparent to those skilled in the art that the parts such as slide bearings 28, 29, journal 30 of the stationary disc, spring 32, thrust bearing 33, bores 48, rods 49, stoppers 49a and so forth are eliminated, if the stationary disc 31 is fixed to the former 47, so that the coil winding machine as a whole can have a simplified construction.

The tapered surface 34c on each of the winding cores 34 is not essential but is effective for concentrating the wires 8 to the bottom of the slot 2 at a higher density. The distance between the end surface of the core 1 and the tapered surface 34c of each winding frame 34 is suitably selected in accordance with the distance between the bottom of the slot 2 and the bearing 1a of the core 1, and is preferably corrected in accordance with the data obtained for various diameters of the wire 8 and number of turns of the coil.

Figure 7:
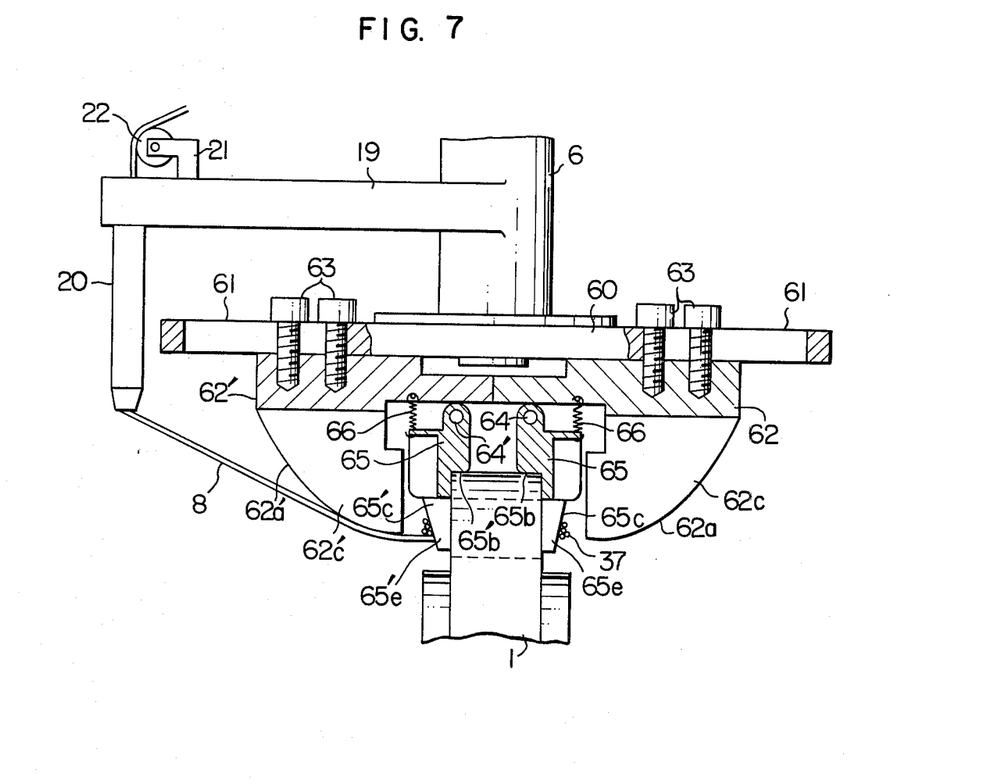
FIG. 7 is an enlarged sectional view of an essential part of a coil winding machine which is another embodiment of the invention.

FIG. 7 shows another embodiment of the invention which is designed specifically for coil windings on the cores having an equal diameter but various lamination thicknesses. In this Figure, the same reference numerals are used to denote the same parts or members as those of FIG. 2.

Under the rotary shaft 6, rotatably supported is an adjusting plate 60 at predetermined points on which formed are a pair of elongated bores 61. A pair of guide pieces 62, 62' are fixed by means of bolts 63 which slidably passes the elongated bores 61. As is the case of the former 47 of the preceding embodiment, guide surfaces 62a, 62'a, as well as tapered surface and groove 62c, 62'c are formed on the guide pieces 62, 62'. The guide pieces 62, 62' carry at their lower surfaces shafts 64, 64' by means of which rotatably supported are winding frames 65, 65'. The winding frames 65, 65' are provided with steps 65b, 65'b adapted to contact the outer peripheral surface of the core 1 and tapered surfaces 65c, 65'c around which the coil 37 is to be formed and adapted for facilitating the withdrawal of the winding frames 65, 65' from the coil 37 formed therearound. Tapered surface and groove 65e, 65'e are formed in both sides and lower end of each of the winding frames 65, 65'. Springs 66 are stretched between the upper outer ends of the winding frames 65, 65' and corresponding guide pieces 62, 62'. These spring exert comparatively small force which act to bias the free ends of the winding frames 65, 65' away from each other.

In operation, the winding frames 65, 65' are lowered toward the core 1 which has been placed beforehand at the predetermined position. As the stepped portions 65b, 65'b of the winding frames 65, 65' come into contact with the outer peripheral surface of the core 1, the winding frames 65, 65' are moved from each other overcoming the force of the springs 66 into close contact with the outer peripheral surface and the end surface of the core 1.

The flyer starts to rotate in this state to perform the winding of the coil. After completion of winding of the predetermined number of turns, the rotary shaft 6 is raised, which in turn causes the upward movement of the adjusting plate 61, guide pieces 62, 62' and the winding frames 65, 65' thereby to withdraw the winding frames 65, 65' from the coil 37 wound on the latter. Then, the bending of the coil 37 is effected in the same manner as that in the preceding embodiment.

When the coil winding machine of this embodiment is used for a core having a different lamination thickness, the guide pieces 62, 62' are slid along the elongated bores 51 after loosening the bolts 63. Then, the bolts 63 are tightened with the winding frames 65, 65' kept in close contact with the new core 1. The machine is now ready for the coil winding around this new core 1.

In this second embodiment, the supporting positions for supporting the winding frames 65, 65' may be shifted to position closer to the springs 66. By so doing, the centroid or gravity center of each winding frame with respect to the pivot shaft 64, (64') is shifted to permit the free end of the winding frames 65, 65' to move away from each other due to the weights of the winding frames 65, 65', so that the springs 66 are eliminated.

Figure 8:
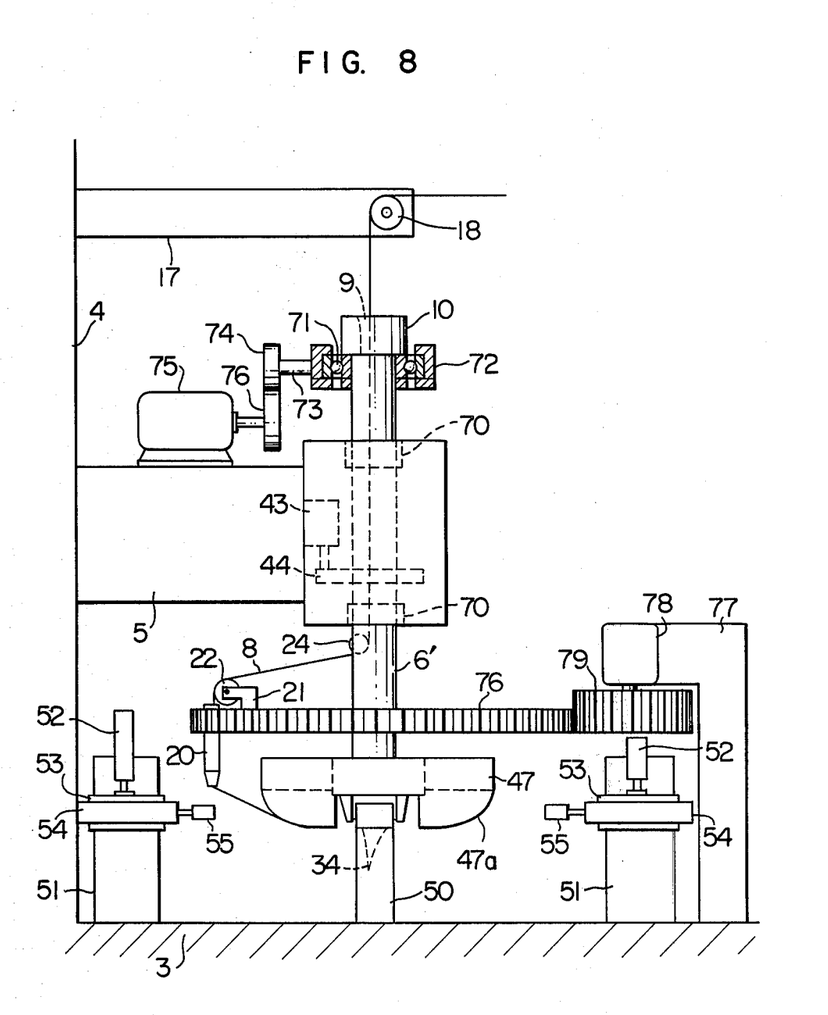
FIG. 8 is a schematic side elevational view of a coil winding machine which is still another embodiment of the invention.
Figure 9:
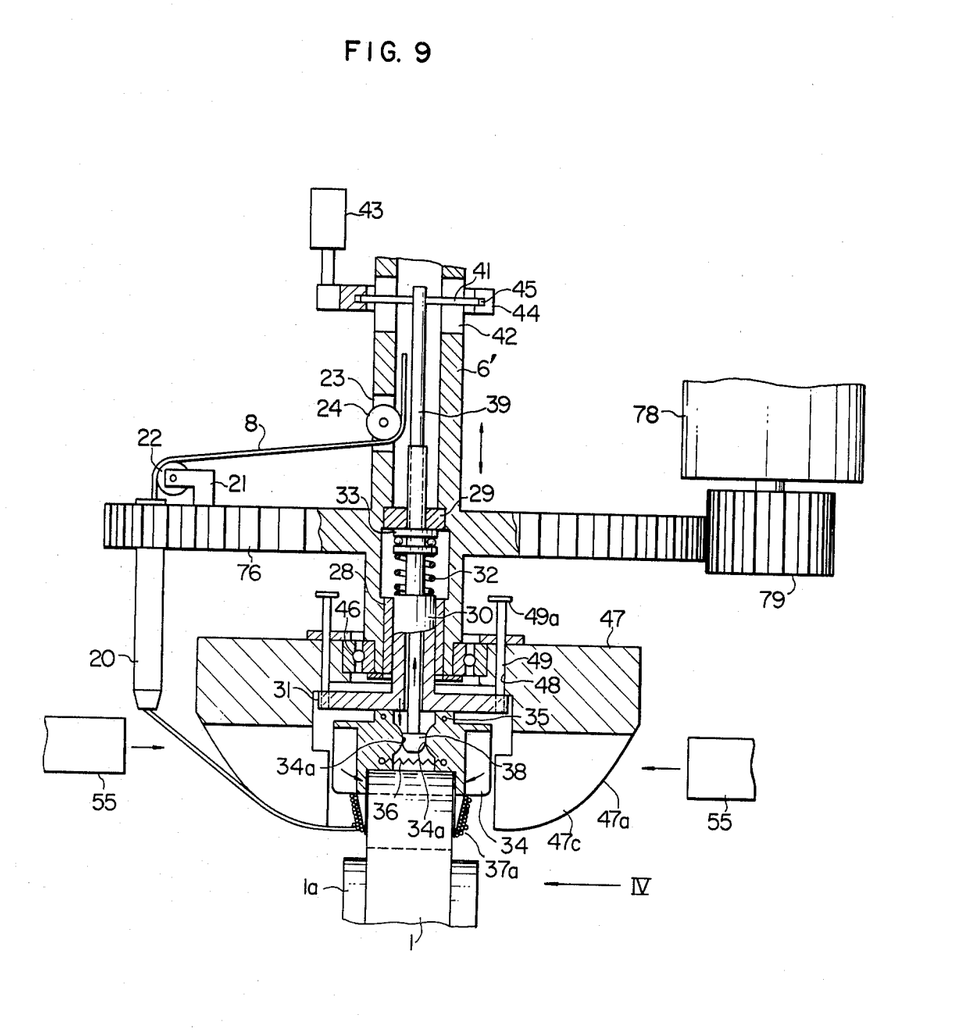
FIG. 9 is an enlarged sectional view of an essential part of the coil winding machine shown in FIG. 8.

FIGS. 8 and 9 in combination show a coil winding machine which is still another embodiment of the invention.

In these Figures, the same reference numerals are used to denote the same parts or members as those in FIGS. 1 to 5. A rotary shaft 6' is rotatably and slidably carried by one end of the arm 5 through a slide bearing 70, and is provided at its upper end with a sleeve 10. Below the sleeve 10, a case 72 is mounted rotatably by means of a bearing 71. A shaft 73 projecting from this case 72 rotatably carries at its one end a cam roller 74. Also, the aforementioned arm 5 carries a motor 75 having an output shaft to one end of which fixed is a cam 76 adapted to engage the cam roller 74. Thus, the arrangement is such that the rotation of the output shaft of the motor 75 causes an axial sliding movement of the rotary shaft 6' through the action of the cam 76 and the cam roller 74. To the lower end of the rotary shaft 6', unitarily fixed is a gear 76 to which fixed is a nozzle 20 so as to be directed downwardly. The gear 76 and the nozzle 20 in combination constitute a flyer. A column or pillar 77 standing up from the base 3 supports a motor 78 having an output shaft to which is a gear 79 for meshing the aforementioned gear 76. It will be seen that, as the motor 78 is energized, the rotary shaft 6' is rotated through the action of the gears 79 and 76.

In operation, the guide is set on the outer peripheral surface of the core 1 which has been fixed at the predetermined position. At the same time, the arm 5 is lowered to press the stepped portions 34b of the winding frames 34 onto the outer peripheral surface of the core 1, so that a certain slack is given to the spring 32. Then, the cylinder 43 is energized to bring the cam 38 into engagement with the projections 34a of the winding frames 34, thereby to bias the lower ends of the winding frames 34 away from each other overcoming the force of the spring 36. Subsequently, the rotary shaft 6' is moved down to lower the former 47 until the lower surface of the latter comes to take the same level as the lowermost part of the portion of winding frames 34 around which the coil is wound.

Then, the leading end of the wire 8 extracted from the nozzle 20 is fastened to the predetermined position. The motors 75 and 78 are started in this state. As a result, the rotary shaft 6' is moved up and down in synchronization with the rotation thereof, together with the former 47 and the nozzle 20, so that the wire 8 is continuously extracted from the nozzle 20 and is wound around the winding frames 34 and in the slots 2 of the core 1. After winding a predetermined number of turns of the wire 8, the motors 75 and 78 are stopped and, then, the cylinders are energized to bring the bending members 55 into contact with the winding frames 34 to place them at positions above the end coil 37a formed around the winding frames 34. Subsequently, after raising the cam 38, the winding frames 34 are extracted from the coil 37. Then, the cylinders 52 are energized to press the bending members 55 against the end coil 37a thereby to bend the latter.

Thus, the winding of coils around the core 1 and the shaping of the formed coils can be achieved fully automatically. In addition, since the wires 8 are wound regularly in the slots 2, the rate of occupation of the slot volume is considerably improved.

In this embodiment, it is necessary that the winding frames 34 are pressed against the core 1 by the resetting force of the spring 32, even after the rotary shaft 6' is moved to the raised position. Therefore, the amount of slack of the spring 32 must be selected to be greater than the amount of traverse of the rotary shaft 6' which is required during the winding operation.

What is claimed is:

1. In a coil winding machine for winding coils on a core of a dynamoelectric machine, said coil winding machine having a rotary shaft, a flyer carried by one end of said rotary shaft and adapted to be rotated around said core which is located beneath said rotary shaft, and at least one guide disposed on the outer peripheral surface of said core, said guide being adapted to guide the wire which is continuously extracted from said nozzle as said flyer is rotated, such that said wire is laid in a pair of slots formed in said core thereby to form coils around said core, an improvement which comprises: a former rotatably carried by the lower end of said rotary shaft and having a pair of guide surfaces projecting to oppose to the end surface of said core, said former being adapted to guide and direct said wire, which has been extracted from said nozzle and laid in said slots, toward the bottoms of respective slots; a pair of winding frames supported by said former so as to be positioned between said former and said end surface of said core, so that said wire of said coil formed by said flyer is wound round said winding frames to form an end coil; a pair of bending means which are disposed to oppose to each other with said winding frames interposed therebetween; and means for moving said bending means toward and away from said winding frames and also in the up and down directions so as to be able to bend said end coil wound round said winding frames toward the axis of said core.

2. A coil winding machine for winding coils on a core of a dynamoelectric machine as claimed in claim 1, wherein said former is constituted by an adjusting plate rotatably carried by the lower end of said rotary shaft, and a pair of guide pieces which are supported movably in the axial direction of said core, each of said guide pieces carrying corresponding one of said winding frames.

3. A coil winding machine for winding coils on a core of a dynamoelectric machine, said coil winding machine having a rotary shaft, a flyer carried by one end of said rotary shaft and adapted to be rotated around said core which is located beneath said rotary shaft, and at least one guide disposed on the outer peripheral surface of said core, said guide being adapted to guide the wire which is continuously extracted from said nozzle as said flyer is rotated, such that said wire is laid in a pair of slots formed in said core thereby to form coils around said core, an improvement which comprises: a former rotatably carried by the lower end of said rotary shaft and having a pair of guide surfaces projecting to oppose to the end surface of said core, said former being adapted to guide and direct said wire, which has been extracted from said nozzle and laid in said slots, toward the bottoms of respective slots; a stationary disc having a journal slidably extending through the central portion of said former, said journal being slidably and rotatably carried by said rotary and biased to project out of said rotary shaft; a pair of winding frames rotatably supported by said stationary disc so as to be positioned between said end surface of said core and said guide surfaces of said former and spaced by a predetermined distance from each other, so that said wire of said coil formed by said flyer is wound round said winding frames to form an end coil; a pair of bending means which are disposed to oppose to each other with said winding frames interposed therebetween; and means for moving said bending means toward and away from said winding frames and also in the up and down directions so as to be able to bend said end coil wound round said winding frames toward the axis of said core.

4. In a coil winding machine for winding coils on a core of a dynamoelectric machine, said coil winding machine having a rotary shaft, a flyer carried by one end of said rotary shaft and adapted to be rotated around said core which is located beneath said rotary shaft, and at least one guide disposed on the outer peripheral surface of said core, said guide being adapted to guide the wire which is continuously extracted from said nozzle as said flyer is rotated, such that said wire is laid in a pair of slots formed in said core thereby to form coils around said core, an improvement which comprises: a former rotatably carried by the lower end of said rotary shaft and having a pair of guide surfaces projecting to oppose to the end surface of said core, said former being adapted to guide and direct said wire, which has been extracted from said nozzle and laid in said slots, toward the bottoms of respective slots; a stationary disc having a hollow journal slidably extending through the central portion of said former, said hollow journal being rotatably and slidably carried by said rotary shaft and is biased to project out of said rotary shaft; a pair of winding frames rotatably supporting by said stationary disc so as to be positioned between said end surface of said core and said guide surfaces of said former and spaced by a predetermined distance from each other, said winding frames being provided on their opposing surfaces with arcuate projections, said wire of said coil formed by said flyer is wound round said winding frames to form an end coil; a rod rotatably and slidably passing through said stationary disc and adapted to be driven in the axial direction of said rotary shaft; a cam rotatably coupled to one end of said rod and adapted to be driven into the space between said winding frames to engage said projections of said winding frames thereby to bias said winding frames away from each other; a pair of bending means which are disposed to oppose to each other with said winding frames interposed therebetween; and means for moving said bending means toward and away from said winding frames and also in the up and down directions so as to be able to bend said end coil wound round said winding frames toward the axis of said core.

5. In a coil winding machine for winding coils on a core of a dynamoelectric machine, said coil winding machine having a rotary shaft, a flyer carried by one end of said rotary shaft and adapted to be rotated around said core which is located beneath said rotary shaft, and at least one guide disposed on the outer peripheral surface of said core, said guide being adapted to guide the wire which is continuously extracted from said nozzle as said flyer is rotated, such that said wire is laid in a pair of slots formed in said core thereby to form coils around said core, an improvement which comprises: a rotary shaft rotatable and reciprocatingly movable in the axial direction in synchronization with the rotation; a former rotatably carried by the lower end of said rotary shaft and having a pair of guide surfaces projecting to oppose to the end surface of said core, said former being adapted to guide and direct the wire, which has been extracted from said nozzle, to a predetermined portion of said slot; a stationary plate having a hollow journal slidably extended through the central portion of said former, said journal being rotatably and slidably supported by said rotary shaft and is biased to project out of said rotary shaft; a pair of winding frames rotatably secured to said stationary plate so as to be positioned between the end surface of said core and said guide surfaces of said former and spaced from each other by a predetermined distance, the opposing surfaces of said winding frames being provided with arcuate projections, the wire of said coil formed by said flyer being wound also around said winding frames to form an end coil; a rod rotatably and slidably extending through said stationary plate; a cam rotatably secured to one end of said rod and adapted to be driven into the gap between said winding frames to engage said projections thereby to bias said winding frames away from each other; a pair of bending means disposed to oppose to each other with said winding frames interposed therebetween; and means for moving said bending means toward and away from said winding frames and also in the up and down directions so as to be able to bend said end coil wound round said winding frames toward the axis of said core, whereby coils are regularly found and formed on said core.

6. A coil winding machine for winding coils on a core of a dynamoelectric machine as claimed in claim 5, characterized by further comprising a transmission member attached to the lower end of said rotary shaft and adapted to transmit the torque to the latter, said transmission member constituting said flyer in combination with a nozzle fixed thereto, whereby said flyer is driven directly.

* * * * *